E. GARDNER.
FRUIT AND VEGETABLE STAND AND ROTARY OR TURBINE SPRAYER.
APPLICATION FILED AUG. 1, 1908.
953,676.
Patented Mar. 29, 1910.
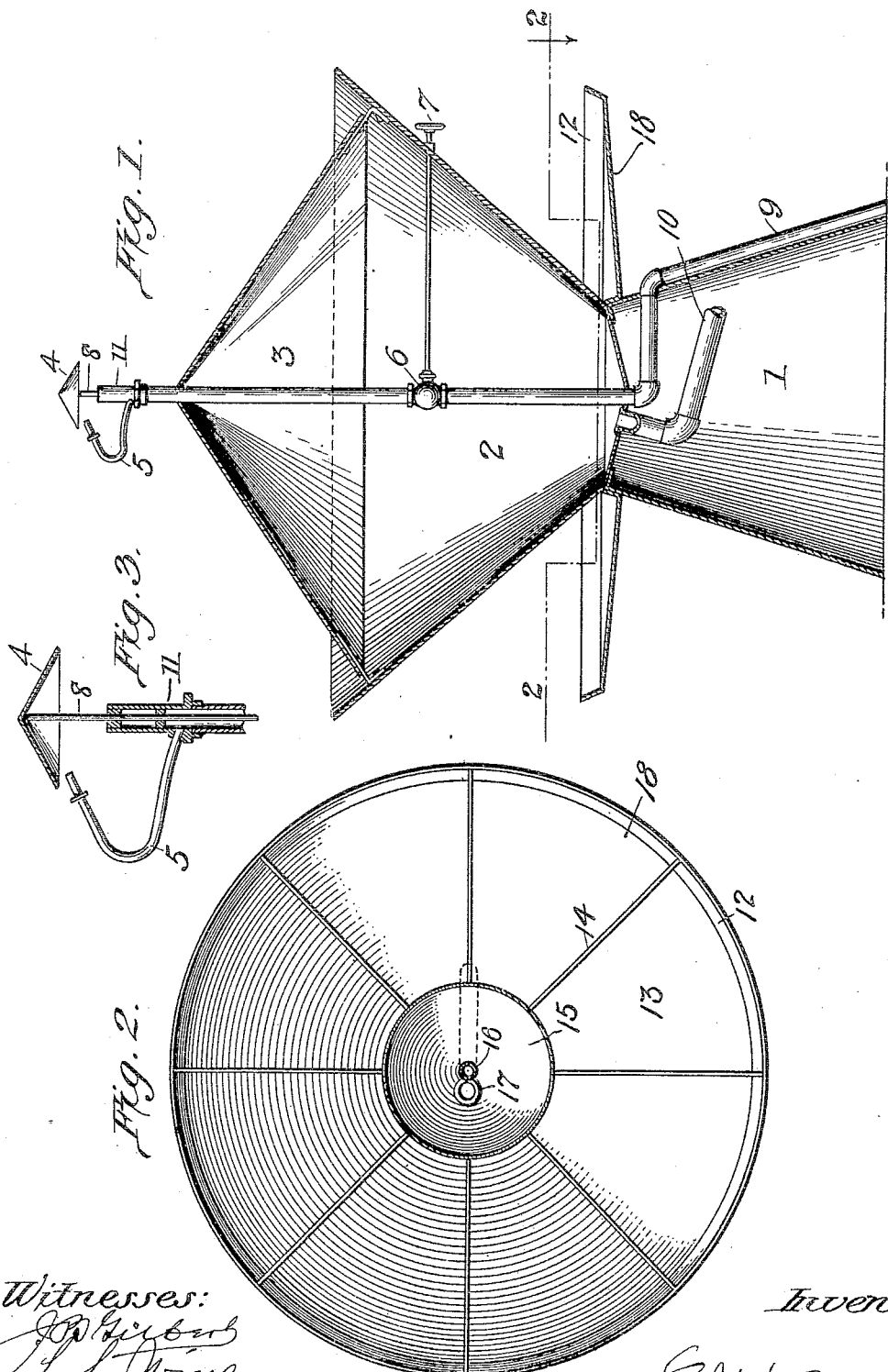

UNITED STATES PATENT OFFICE.

ELIJAH GARDNER, OF ROCKFORD, WASHINGTON, ASSIGNOR OF ONE-FOURTH TO JOHN C. ALMACK, OF ROCKFORD, WASHINGTON, AND ONE-FOURTH TO WILLIAM H. KELLER, OF SPANGLE, WASHINGTON.

FRUIT AND VEGETABLE STAND AND ROTARY OR TURBINE SPRAYER.

953,676.     Specification of Letters Patent.      Patented Mar. 29, 1910.

Application filed August 1, 1908. Serial No. 446,485.

*To all whom it may concern:*

Be it known that I, ELIJAH GARDNER, a citizen of the United States, residing at Rockford, in the county of Spokane, State of Washington, have invented a new and useful Fruit and Vegetable Stand and Rotary or Turbine Sprayer, of which the following is a specification.

My invention has for its object to provide a convenient place in which fruit may be kept dry and cool, and vegetables wet and fresh, to utilize space in the best possible manner both to keep and to exhibit fruit and vegetables in any market place.

In its generic nature the invention comprises a base (or support) on which is mounted a cone-shaped body with the larger base uppermost, in which the base of a smaller cone-shaped body may rest.

The top cone-shaped body is to be used as a receptacle for vegetables, and to have a rotary spray wheel and nozzle above its center, the spray wheel and nozzle being screwed onto the top end of a gaspipe which is attached to the water supply pipe near the base of the support and entering at an angle near the top of the support, thence upward through the center of the dome to and through the apex of the upper cone-shaped body, the aforesaid gaspipe having a stop cock near the middle and within the dome shaped body which is manipulated by a wheel handle attached to a rod which leads to the outside of the dome shaped body.

More specifically my invention includes those novel details of construction, combination and arrangement of parts, all of which will be first described, and then be specifically pointed out in the appended claim, reference being made to the accompanying drawings, in which:—

Figure 1 is a vertical section of the entire fruit and vegetable stand and vegetable sprayer. Fig. 2 is a plan view of the lower shelf. Fig. 3 is a central vertical longitudinal section of the spray wheel and its bearings, and a complete perspective view of the nozzle.

Referring now to the accompanying drawings, in which like numerals of reference refer to like parts in all the figures: 1 designates the base or support which carries all the other parts of the apparatus, shelf 18 being first fitted at the top of the base on the outside by letting the opening in the center of the shelf encircle the top of the base 1, said opening being only of such size as to allow the upper part of the base 1 to enter sufficiently to become firmly set. 2, a cone-shaped body is placed, as in the drawing, with the small base downward and permanently fastened to base 1. This cone-shaped member 2 is made of metal.

3 designates a cone-shaped body of sheet metal which enters and fits into the upper base of the member 2, the projecting portion of the member 2 above the cone-shaped member 3 serving as a guard to keep vegetables from sliding off the body 3.

4 designates a spray wheel which is made of sheet metal, disk-shaped, and having small flanges of sheet metal soldered to its inner side, and extending outward, against which water from nozzle 5 strikes, causing rotation of the spray wheel the spray flying outward and onto 3.

5 designates a nozzle which supplies water to 4. It is made of a small curved pipe of metal.

6 designates a stop cock by which the water supply is regulated.

7 designates a rod and handle leading to the stop cock.

8 designates a shaft which is soldered to the center of the inside of the spray wheel 4, it being in reality a part of 4. It revolves bearings as shown in Fig. 3.

9 designates a gaspipe which leads to the water supply to supply water to 4 and 5.

10 designates a gaspipe to discharge surplus water which has passed over and through the vegetables on 3 and thence through perforations at the base of 3 to the inside of 2, then down on the inside of 2 to the top of the base and accumulated on lid 15 which is shown in the center of Fig. 2, said gaspipe entering a hole 17 in lid 15.

11 designates a short gaspipe containing bearings for the shaft 8 which carries the spray wheel 4.

12 designates the outer rim of the shelf 18, and is a sheet metal band to keep fruit on the shelf.

13 designates the sheet metal floor of the fruit shelf.

14 designates partitions of sheet metal placed on edge and soldered to 13 to separate different kinds of fruit and to strengthen 13.

15 designates a metal lid to act as the lower base of 2 for the purpose of accumulating the surplus water at 17.

16 designates a round hole through which 9 passes.

17 designates a round hole in which the upper end of 10 is soldered.

It is obvious that numerous changes in the details of construction may be made without departing from the spirit of the invention or the scope of the appended claim.

I claim:—

In an apparatus of the class described, a support, a cone-shaped member mounted with its smaller base resting on the support, a second cone-shaped member resting upon its base on the inside of the first cone-shaped member, the two parts forming a dome a water pipe passing through and above the dome and means attached to the end of the pipe for spraying vegetables or produce resting on the upper cone-shaped member.

In testimony whereof, I have hereunto set my hand in presence of two subscribing witnesses.

ELIJAH GARDNER.

Witnesses:
 L. L. WING,
 W. H. KELLER.